Figure 1:
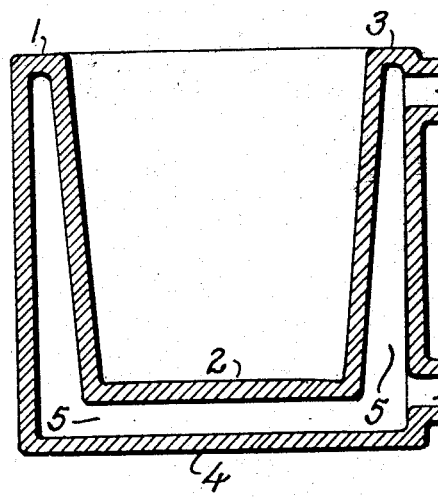

Dec. 10, 1935. L. A. RICHARDS 2,023,490
SYSTEM FOR SUPPLYING, CONTROLLING AND MEASURING SOIL MOISTURE
Filed Jan. 16, 1930

Jackson G. Fuhr
Lal C. Verman
(Witnesses)

Lorenzo Adolph Richards
(Inventor)

Patented Dec. 10, 1935

2,023,490

UNITED STATES PATENT OFFICE 2,023,490

SYSTEM FOR SUPPLYING, CONTROLLING, AND MEASURING SOIL MOISTURE

Lorenzo Adolph Richards, Ithaca, N. Y.

Application January 16, 1930, Serial No. 421,326

21 Claims. (Cl. 47—48)

My system consists essentially of the following: 1. A reservoir filled with water and constructed in such a manner as to make possible the maintenance of hydrostatic pressures in the water less than atmospheric pressures. 2. A porous medium, (such as porous porcelain or fire clay) one side of said medium to be in contact with the reservoir water and the other side of said medium to be in contact with and supporting, such as on a flat plate, or surrounding, as in an ordinary flower pot, the soil to which moisture is being supplied or in which moisture is being controlled or measured.

Porous cups and cones, sometimes called auto-irrigators, have been used to supply moisture to soil, but these have been of limited usefulness. Such irrigators, in the form of cups or cones necessarily limit either, the area of the water supplying surface or the quantity of soil present in proximity to the irrigator and what is more serious, it is difficult to obtain good capillary contact between cups or cones and soil. My system, making use of entirely new forms of apparatus and new water and air control methods, avoids these difficulties and is fundamentally different in principle from soil moisture control devices heretofore patented.

From hydrodynamical theory and experiment it is well known that water flows from regions of high pressure to regions of low pressure (neglecting gravity and other body forces because these are small compared with the hydrostatic or capillary forces involved in the soil systems under discussion). For soils this fact is expressible by the relation:

(1) $$V = -K\Delta\Psi$$

where V is velocity of flow, K is a conductivity factor and $\Delta\Psi$ is the gradient of a pressure potential $\Psi$, having a value at any point B within a liquid defined by the expression:

(2) $$\Psi B = \int_A^B dp/\rho$$

where $dp$ is the pressure differential, $\rho$ is the density of the liquid and A is atmospheric pressure. For water between soil particles $\Psi$ is (with the proper choice of units) numerically equal to the hydrostatic pressure. I have made many experiments determining the relation between this potential and the moisture content in various soils. $\Psi$ is negative in unsaturated soil and may have values of many atmospheres (in absolute magnitude) under soil moisture conditions which are agriculturally important. This potential is a direct measure of the security with which water is held by the soil and it is precisely this magnitude which is regulated or determined by my system for supplying, controlling or measuring soil moisture.

When equilibrium distribution of moisture in a mass of soil obtains, V in Equation (1) must be small and hence K or $\Delta\Psi$ or both must be small. My apparatus is so designed as to make K as large as possible, hence equilibrium will be rapidly approached and the potential at all points in the soil mass will be nearly uniform and equal to the value determined by the pressure in the water reservoir.

Other automatic watering devices function by having K small and obtaining an uncertain balance between the flow of water into the soil through a capillary system and the outward flow, or loss of water from the soil by evaporation or transpiration. If outward flow ceases, the soil becomes too wet. If outward flow increases, the soil dries out because the existing potential gradients cannot supply sufficient moisture through the high capillary resistance. Such systems depend on the dynamical balance between in flow and out flow for controlling soil moisture condition. Should either the in flow or out flow or capillary resistance change, then the soil moisture content under the new balance conditions is changed.

With my system the desired moisture content, or the desired security with which the water is to be held by the soil, is determined and maintained by the reservoir water pressure. Any loss of water from the soil causes an increase in the curvature of the air water interfaces of the moisture between soil particles. This causes a decrease in the soil water pressure and an influx of water from the reservoir. This adjustment is rapidly made because the distance the water moves through the soil is small, the water supplying surface is large and the porous medium separating the reservoir water and the soil is relatively thin.

It is upon this new principle for the operation of auto-irrigating apparatus and also upon the new design of the porous cells described below that this patent is claimed. Different forms of apparatus used in my system for supplying, controlling and measuring soil moisture are shown in the accompanying illustrations.

Figure 4:
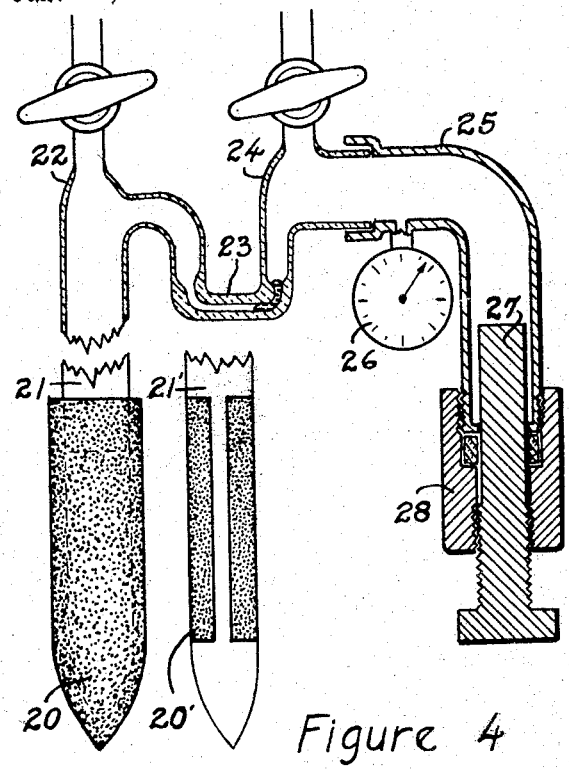
Figure 2:
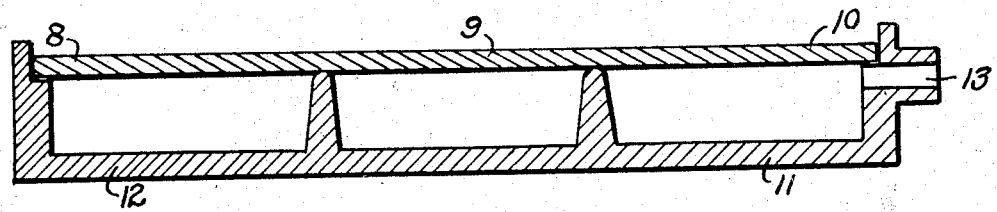
Figure 3:
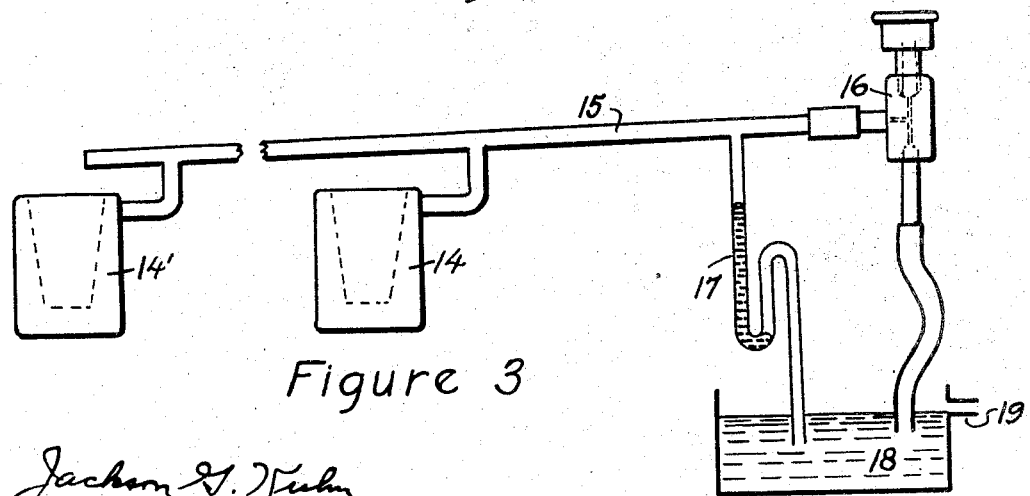

Fig. 1 shows a cell in cross-section; Fig. 2 a a cell for greenhouse use; Fig. 3 the system applied to a number of cells; Fig. 4 a capillary potentiometer.

Figure 1 shows a cross section through a capillary cell in the form of an automatic watering flower pot. The wall 1—2—3 is made of porous material. The wall 1—4—3 is made of any rigid material, porous or non porous. The complete wall 1—2—3—4—1, however, is such that when the reservoir space 5 is filled with water under a tension (or negative pressure) of one atmosphere, air does not leak into the reservoir. The opening 6 provides a means for removing air from the reservoir. The opening 7 leads to a water supply so arranged as to maintain less than atmospheric pressure in the water in the reservoir. The single opening 6 may serve both of these puposes. The soil cavity, 1—2—3, and the outer wall, 1—4—3, may be of any shape such as conical, cylindrical, rectangular, or any other artistically pleasing form for ornamental purposes. Also the cell may be made of any size.

Figure 2 shows a capillary cell particularly adaptable for green house use. The dimensions and proportions may be widely varied. The essential elements are the flat porous plate 8—9—10, and the supporting case 11—12, made together as one piece of porous material, or, the case may be made of any suitable material and the plate attached thereto by an air tight seal. The opening at 13 serves the same purposes as 6 and 7 in Figure 1.

Figure 3 shows a system for automatically removing air and maintaining any desired capillary cell reservoir pressure for any number of capillary cells. The cells 14, 14', etc., are joined by the pipe 15 to the aspirator pump 16 and the bent tube 17 containing a mercury column. The pipe 15 slopes so that any air leaking into the system through the cells or connections will move toward 16. The water passing through the aspirator is conducted to the tank 18 which has an overflow at 19. The aspirator suction maintains a small stream of water upward through the mercury in the tube 17 and out through 16. Any air is removed from the system by this circulation. The overflow maintains a water supply at constant level in 18 and the pressure in 15 is determined by the amount of mercury in 17. Mercury will be unnecessary when only low tensions in the reservoir are desired.

Figure 4 shows a capillary potentiometer, i. e., a cell arranged for measuring capillary potential. It operates on the same principle and has the same essential elements as the cells in Figures 1 and 2. It has a porous wall and a water reservoir filled with water at some controllable pressure, but the arrangement and form are designed for a different purpose. The porous material 20 or 20' is sealed to the metal tube 21 or 21' which in turn is joined to the glass tube 22—23—24 provided with the stop-cocks and a capillary section containing a drop of mercury. The metal part 25, carrying the vacuum gauge 26, and the plunger 27 moving through the packing gland 28, completes the potentiometer.

For operation the apparatus is filled with water. The cup is placed in soil and the pressure in the cup water is reduced with the plunger 27 till the mercury drop at 23 indicates flow of water from cup to soil has ceased. The gage then indicates the capillary potential of the soil water at the surface of the cup.

I am aware that numerous details of construction of the several forms of apparatus described above may be varied through a wide range without departing from the principles of my invention and I therefore do not purpose limiting the patent granted to the forms of apparatus herein illustrated and described.

A continuing application, Serial No. 749,908, filed by applicant on October 25, 1934, covering matter disclosed but not claimed in this application has been filed.

What I claim as my invention is:

1. The method of automatic irrigation of soil which comprises maintaining a substantially zero pressure differential between the moisture in the soil and the source of supply, the water in said source of supply being maintained at less than atmospheric pressure by a predetermined constant amount.

2. The method of automatic irrigation of soil which comprises feeding moisture to soil through capillary action and maintaining a state of substantial pressure equilibrium between the soil moisture and a moisture feeding system whose water is maintained at a pressure less than atmospheric pressure by a predetermined constant amount.

3. The method of automatic irrigation of soil which comprises maintaining a source of supply in condition in which it is capable of delivering moisture in excess of the demand, and maintaining a substantially constant pressure differential between the atmospheric pressure and the pressure of the moisture in the soil being fed.

4. The method of automatic irrigation of soil which comprises maintaining a source of supply in a condition in which it is capable of delivering moisture in excess of the demand and maintaining a substantially constant capillary potential in the soil being fed.

5. The method of automatic irrigation of soil which comprises maintaining a source of supply in a condition in which it is capable of delivering moisture in excess of the demand, feeding the moisture through capillary action to the soil, and maintaining a substantially constant pressure differential between atmospheric pressure and the water pressure in the soil being irrigated.

6. The method of irrigation of soil which comprises automatically supplying moisture through capillary conduction through a porous medium to soil at a rate substantially equal to the rate of loss of moisture from the soil.

7. The method of irrigation of soil which comprises automatically supplying moisture through capillary conduction through a porous medium to soil at a rate equal to the absorption of moisture from the soil and substantially preventing a pressure differential between the moisture in the soil and the source of supply at any given level.

8. In an auto-irrigation system for soil, a source of moisture supply, a moisture conducting system including a porous medium extending from said source to said soil, and means including said system for supplying the moisture at a rate equal to the absorption of the moisture from the soil.

9. In an auto-irrigation system for soil, a source of moisture supply, a moisture conducting system including a porous medium extending from said source to said soil, means including said system for supplying the moisture at a rate equal to the absorption of the moisture from the soil, and means for maintaining a predetermined capillary potential in the soil.

10. An auto-irrigator comprising a capillary cell in the form of a plant pot having a double spaced wall, the inner wall of which is made of a material pervious to water but not to air to permit the conduction of moisture to the interior of said pot and the outer wall of said pot being impervious to water and to air.

11. An auto-irrigator comprising a capillary cell in the form of a plant pot having a double spaced wall forming a reservoir for water, the inner wall of which is made of a water porous material to permit the conduction of moisture to the interior of said pot, said double wall covering substantially the entire area of said pot walls, the outer wall, when the reservoir is filled with water, preventing air from leaking into the reservoir.

12. An auto-irrigator comprising a capillary container for plants having a double spaced bottom wall forming a reservoir to house a supply of water, the inner bottom wall being made of a water porous material to conduct said water to the chamber formed by said pot, the outer wall, when the reservoir is filled with water under tension, preventing air from leaking into the reservoir.

13. An auto-irrigator comprising a capillary container for plants having a double spaced wall forming a reservoir to house a supply of water, the inner wall being made of a water porous material to conduct said water to the chamber formed by said pot, the outer wall when the reservoir is filled with water, preventing air from leaking into the reservoir, and means for admitting water to said reservoir.

14. An auto-irrigator comprising a capillary container for plants having a double spaced bottom wall forming a reservoir to house a supply of water, the inner bottom wall being made of a water porous material to conduct said water to the chamber formed by said pot, means including the outer wall for preventing air from leaking into the reservoir when filled with water under tension and means for admitting water to said chamber at a predetermined constant pressure differential with respect to the atmospheric pressure.

15. An auto-irrigator comprising a capillary container for plants having a double spaced wall forming a reservoir to house a supply of water, the inner wall being made of a water porous material to conduct said water to the chamber formed by said pot, means for admitting water to said chamber, means including the outer wall for preventing air from leaking into the reservoir when filled with water and means for maintaining a predetermined pressure differential between the water in the source of supply and atmospheric pressure.

16. In an auto-irrigation system for soil, a source of moisture supply, a moisture conducting system including a porous medium extending from said source to said soil, and means connected to said system for automatically removing any air which may have leaked into the system.

17. An auto-irrigator comprising a capillary container for plants having a double spaced wall forming a reservoir to house a supply of water, the inner wall being made of a water porous material to conduct said water to the chamber formed by said pot, the outer wall, when the reservoir is filled with water preventing air from leaking into the reservoir and a spout connection to said reservoir to provide a connection to a water supply.

18. An auto-irrigator comprising a capillary container for plants having a double spaced wall forming a reservoir to house a supply of water, the inner wall being made of a water porous material to conduct said water to the chamber formed by said pot, the outer wall when the reservoir is filled with water, preventing air from leaking into the reservoir, and a single means for admitting water to said chamber and conducting out any air which has leaked into the system.

19. The method of measuring capillary tension of a soil which comprises supplying moisture through a porous medium to the soil being measured and measuring the pressure at which the flow of water through the porous medium to the soil ceases.

20. A capillary tension gauge comprising a porous cup, means for supplying water thereto under tension, means for detecting flow of water through the walls of said porous cup, means for adjusting water tension for preventing the flow of water through said walls and a vacuum gauge for measuring the tension of the water when the water ceases to flow through said porous walls.

21. An auto-irrigator comprising a capillary container for plants having a double spaced wall forming a reservoir to house a supply of water, the inner wall being made of a water porous material to conduct said water to the chamber formed by said pot, the outer wall, when the reservoir is filled with water preventing air from leaking into the reservoir and a plurality of spout connections to said reservoir to provide connections for admitting water to and conducting water away from said reservoir.

LORENZO ADOLPH RICHARDS.